(12) United States Patent
Ma et al.

(10) Patent No.: US 7,572,849 B2
(45) Date of Patent: Aug. 11, 2009

(54) UREA PHENYL DERIVATIVES AND THEIR USE AS POLYPROPYLENE NUCLEATING AGENTS

(75) Inventors: Qinggao Ma, Naugatuck, CT (US); William A. Wortman, Harwinton, CT (US); Jin-yun Wang, Cheshire, CT (US); Huiling Ding, Cheshire, CT (US); Roy Russell, Waterbury, CT (US); Leigh C. Allen, Winchester, CT (US); Paul E. Stott, Oxford, CT (US); John Wefer, Newtown, CT (US); David J. Sikora, Middlebury, CT (US)

(73) Assignee: Chemtura Corporation, Middlebury, CT (US)

( * ) Notice: Subject to any disclaimer, the term of this patent is extended or adjusted under 35 U.S.C. 154(b) by 666 days.

(21) Appl. No.: 11/283,314

(22) Filed: Nov. 18, 2005

(65) Prior Publication Data
US 2007/0117890 A1 May 24, 2007

(51) Int. Cl.
*C08K 5/21* (2006.01)
*C07C 273/02* (2006.01)

(52) U.S. Cl. ........................... 524/212; 564/50
(58) Field of Classification Search ............... 524/212; 564/51
See application file for complete search history.

(56) References Cited

U.S. PATENT DOCUMENTS

| | | | | |
|---|---|---|---|---|
| 3,386,955 A * | 6/1968 | Nawakowski et al. | ........ | 528/102 |
| 3,819,561 A * | 6/1974 | Bruenner | ..................... | 524/212 |
| 3,852,237 A | 12/1974 | Osborn et al. | ............ | 260/42.21 |
| 4,016,118 A | 4/1977 | Hamada et al. | ............ | 260/17.4 |
| 4,292,747 A | 10/1981 | Hoppe | ............................ | 37/58 |
| 4,338,228 A | 7/1982 | Inoue et al. | ................. | 524/120 |
| 4,371,645 A | 2/1983 | Mahaffey | .................... | 524/108 |
| 4,562,265 A | 12/1985 | Machell | ....................... | 549/364 |
| 4,585,817 A | 4/1986 | Su et al. | ....................... | 524/108 |
| 4,694,064 A | 9/1987 | Tomalia et al. | .............. | 528/332 |
| 4,749,736 A | 6/1988 | Khanna et al. | .............. | 524/230 |
| 5,049,605 A | 9/1991 | Rekers | ....................... | 524/108 |
| 5,137,973 A | 8/1992 | Khanna et al. | .............. | 525/177 |
| 5,198,484 A | 3/1993 | Mannion | ..................... | 524/108 |
| 5,216,051 A | 6/1993 | Smith et al. | .................. | 524/108 |
| 5,278,216 A | 1/1994 | Asanuma et al. | ............ | 524/394 |
| 5,574,174 A | 11/1996 | Syed | ........................... | 549/364 |
| 5,658,708 A * | 8/1997 | Kondo | ..................... | 430/288.1 |
| 6,235,823 B1 | 5/2001 | Ikeda et al. | .................. | 524/229 |
| 2001/0016259 A1 | 8/2001 | Campbell et al. | ............ | 428/375 |
| 2003/0096122 A1 * | 5/2003 | Mercx et al. | ................. | 428/458 |
| 2004/0254270 A1 * | 12/2004 | Harashina | ..................... | 524/86 |
| 2005/0203226 A1 | 9/2005 | Mader et al. | ................. | 524/210 |
| 2008/0097074 A1 * | 4/2008 | Ouchi et al. | ................. | 528/354 |

FOREIGN PATENT DOCUMENTS

| | | | |
|---|---|---|---|
| DE | 1951632 | | 10/1969 |
| JP | 52-119654 | * | 4/1976 |
| JP | 05-255685 | * | 10/1993 |
| WO | 95/13317 | | 5/1995 |
| WO | 02/46300 | | 6/2002 |
| WO | 2004/072168 | | 8/2004 |
| WO | 2005/040263 | | 5/2005 |
| WO | WO 2005/063885 | * | 7/2005 |

OTHER PUBLICATIONS

STN document 88:106248.*
STN document 80:71512.*
Polyfunctional Inhibitors; Lebedeva et al.*
Polymer Letters, 1968, pp. 539-546.
Stocker et al., Macromolecules, 1998, 31, pp. 807-814.
J. Appl. Poly Sci., 1999, 74, pp. 2357-2368.
Kotek et al., J. Appl. Poly. Sci., 2002, 85, pp. 1174-1184.
Kristiansen et al., Macromolecules 2003, 36, pp. 5150-5156.
Blomenhofer et al., Macromolecules 2005, 38, pp. 3688-3695.

* cited by examiner

*Primary Examiner*—Marc S. Zimmer
*Assistant Examiner*—John Uselding
(74) *Attorney, Agent, or Firm*—James Cher

(57) ABSTRACT

Disclosed herein are urea phenyl derivatives of the formula:

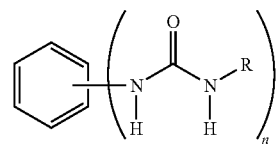

wherein each R is an independently selected hydrocarbyl group and n is 2 or 3, and their use as nucleating agents for propylene polymers.

15 Claims, No Drawings

UREA PHENYL DERIVATIVES AND THEIR USE AS POLYPROPYLENE NUCLEATING AGENTS

BACKGROUND OF THE INVENTION

1. Field of the Invention

The present invention relates to polypropylene resin compositions having excellent crystallizability, high transmittance, high clarity, low haze, and improved thermal stability. More particularly, the present invention relates to a polypropylene resin composition comprising urea phenyl derivatives to reduce haze.

2. Description of Related Art

It is known that crystalline polypropylene may occur in α, β, γ, and δ crystal forms as well as in the smectic crystal form which is formed on quenching of melted polypropylene. The β-crystal form differs from the form found in the conventional natural pellet in that it is lower in melting point and in density and exhibits differences in the mode of crystallization and fracture.

For the production of crystalline polypropylene containing the β-form, processes comprising blending with a small amount of a nucleating agent (hereinafter referred to as "β-nucleating agent") are known.

Typical nucleating agents known in the art include minerals such as chalk, clay, kaolin, talc, silicates, and the like. Organic nucleating agents, such as salts of aliphatic or aromatic carboxylic acids, aromatic salts, metallic salts of aromatic phosphorus compounds, quinacridones, aromatic amides, and polymers having melting points, are more efficient.

U.S. Pat. No. 3,852,237 discloses a combination of agents, such as sodium benzoate with phthalocyanine, that is said to improve the clarity of nucleated polyolefin, such as polypropylene, in molded objects. It is also disclosed that the haze experienced with a single nucleating agent is reduced.

U.S. Pat. No. 4,016,118 discloses a polyolefin plastic composition said to have improved transparency and reduced molding shrinkage, which consists essentially of at least one polymer or copolymer of an aliphatic monoolefin and dibenzylidene sorbitol, the proportion of the dibenzylidene sorbitol being 0.1 to 0.7% by weight based on the total weight of the composition.

U.S. Pat. No. 4,338,228 discloses a polyolefin composition comprising a modified polyolefin obtained by adding an unsaturated carboxylic acid or an anhydride thereof to a polyolefin or mixtures of said modified polyolefin and an unmodified polyolefin, an inorganic filler, one or more nucleating agents or a combination thereof with one or more heat deterioration inhibitors. The polyolefin composition is said to evidence reduced deterioration by heat or reduction of its mechanical strength during a molding operation.

U.S. Pat. No. 4,371,645 discloses a polyolefin plastic composition having improved transparency which comprises a polymer selected from aliphatic polyolefins and copolymers containing at least one aliphatic olefin and one or more ethylenically unsaturated aliphatic comonomers, and a di-acetal of sorbitol of a specified structure in an amount sufficient to improve transparency.

U.S. Pat. No. 4,562,265 discloses a method for producing a di-acetal of sorbitol and an aromatic aldehyde wherein an aqueous solution containing a catalytic amount of a mineral acid and sorbitol is formed. Thereafter, an effective amount of an aromatic aldehyde such as benzaldehyde is incrementally admixed into the homogeneous aqueous admixture containing the sorbitol at a rate sufficient to allow a substantially spontaneous reaction to occur between the D-sorbitol and aromatic aldehyde; thus, forming an aqueous slurry containing crude di-acetal, e.g., dibenzylidene sorbitol. The amount of aromatic aldehyde employed is that amount sufficient to provide a molar ratio of D-sorbitol to aromatic aldehyde of from about 1:0.75 to about 1:1.75. Thereafter, the aqueous slurry is neutralized, and crude di-acetal is removed from the liquid phase and washed with water to remove mono-acetal impurities, e.g., monobenzylidene sorbitol. The washed di-acetal may then be dried to provide dried di-acetal, and the dried di-acetal may be further purified by washing with a relatively non-polar solvent U.S. Pat. No. 4,585,817 discloses the preparation of linear low density polyethylene and copolymers of ethylene with at least one alpha-olefin containing 3-8 carbon atoms having increased temperature of crystallization and rate of crystallization by incorporating a proportion of highly isotactic polypropylene therein with the nucleating compound dibenzylidene sorbitol or phenyl phosphate compound.

U.S. Pat. No. 4,694,064 discloses the preparation of rod-shaped dendrimers having a plurality of dendritic branches emanating from an essentially linear core by first reacting a linear polyfunctional core compound such as a polyethyleneimine with a first dendritic branching reactant such as an ester of an unsaturated carboxylic acid, e.g., methyl acrylate, and then successively reacting the resulting product with a second dendritic branching reactant such as ethylenediamine and then with the first or another dendritic branching reactant. The rod-shaped dendrimers are said to be useful in the production of molecular composites and as crystallinity modifiers for polymeric materials.

U.S. Pat. No. 4,749,736 discloses a crystalline polyamide corporation having dispersed therein a nucleating agent composed of one or more finely divided inorganic materials, one or more fatty acid amides and one or more low molecular weight polymers selected from the group consisting of polyolefins, polyoxides and polysulfides.

U.S. Pat. No. 5,049,605 discloses bis(3,4-dialkylbenzylidene) sorbitol acetals for the formula:

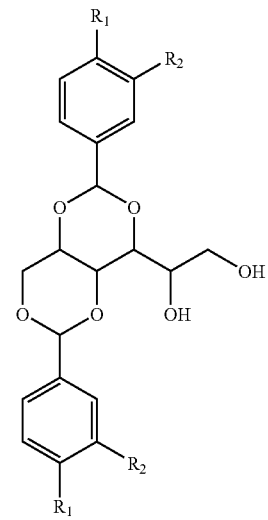

in which $R_1$ and $R_2$ are independently selected from lower alkyl groups containing 1-4 carbon atoms, or together form a carbocyclic ring containing up to 5 carbon atoms.

U.S. Pat. No. 5,137,973 discloses a crystalline polyolefin composition having dispersed therein a nucleating agent composed of one or more polyesters.

U.S. Pat. No. 5,198,484 discloses a process for incorporating a clarifying agent into a semi-crystalline resin whereby a clarifying agent selected from compounds having the formula:

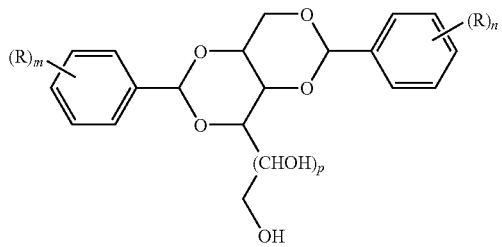

wherein p is 0 or 1, m and n are independently 0-3, and R is, at each occurrence, independently selected from $C_{1-8}$ alkyl, $C_{1-4}$ alkoxy, hydroxy, halogen, $C_{1-6}$ alkylthio, $C_{1-6}$ alkylsulfoxy and a 4 or 5 membered alkyl group forming a carbocyclic ring with adjacent carbon atoms of the unsaturated parent ring, and wherein the clarifying agent is in the form of a powder characterized by a $d_{97}$ of 30 microns or less, and a mean particle size of 15 microns or less, is blended with the polyolefin resin, at a temperature above 170° C. until the clarifying agent is dissolved in the molten resin.

U.S. Pat. No. 5,216,051 discloses tri-acetal polyol compounds and a crystalline polyolefin composition having dispersed therein a nucleating agent composed of one or more of said polyol acetals.

U.S. Pat. No. 5,278,216 discloses a syndiotactic polypropylene resin composition comprising a polypropylene having a substantially syndiotactic structure and a nucleating agent. The syndiotactic polypropylene may be a homopolymer of the propylene, a copolymer of the propylene and a smaller amount of another olefin or a mixture of the above-mentioned (co)polymer and an isotactic polypropylene. The resin composition preferably has a higher crystallization temperature than a polypropylene containing no nucleating agent by 5° C. or more, as measurement is made by a differential scanning thermal analysis.

U.S. Pat. No. 5,574,174 discloses certain 1,3-2,4-di(substituted arylidene)- and 1,3-2,4-di(substituted heteroarylidene)-D-sorbitols that are said to be useful as clarifying and nucleating additives for crystalline and semi-crystalline polyolefin compositions. Also disclosed are such poly($C_1$-$C_8$ alpha olefin) compositions containing them.

U.S. Pat. No. 6,235,823 discloses a crystalline polypropylene resin composition comprising a crystalline polypropylene resin and a β-nucleating agent, and a method of increasing the proportion of β-form crystals in a crystalline polypropylene resin molding comprising molding the composition, the β-nucleating agent being a diamide compound.

U.S. Published patent application Publication No. 2001/0016259 discloses a sizing composition for glass fibers used to reinforce thermoplastic resins, such as polyolefins, and particularly, polypropylene. The composites produced with the fiber strands coated with such sizing compositions have improved fiber adhesion and retention of fiber length. In addition, a method for improving tensile creep and tensile fatigue in polypropylene composites reinforced with glass fibers is provided.

U.S. Published patent application Publication No. 2005/0203226 discloses a composition containing (1) a crystalline polypropylene resin and (2) one or more .beta.-nucleating agents of the formula (I),

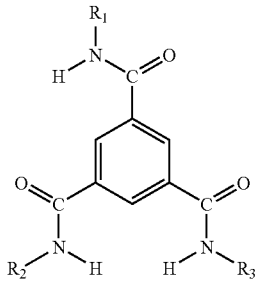

wherein $R_1$, $R_{12}$ and $R_3$, independently of one another, are $C_1$-$C_{20}$ alkyl, $C_2$-$C_{20}$ alkyl substituted by $C_1$-$C_{10}$ alkylamino, di($C_1$-$C_{10}$ alkyl)amino, $C_1$-$C_{10}$ alkyloxy or hydroxy; $C_3$-$C_{20}$ alkenyl, $C_5$-$C_{12}$ cycloalkyl, $C_5$-$C_{12}$ cycloalkyl substituted by 1, 2 or 3 $C_1$-$C_{10}$ alkyl; cyclohexylmethyl; cyclohexylmethyl substituted by 1, 2 or 3 $C_1$-$C_{10}$ alkyl; $C_5$-$C_9$ cycloalkenyl, $C_5$-$C_9$ cycloalkenyl substituted by 1, 2 or 3 $C_1$-$C_{10}$ alkyl; phenyl substituted by 1, 2 or 3 radicals selected from the group consisting, of $C_1$-$C_{10}$-alkyl, $C_1$-$C_{10}$alkyloxy, hydroxy, halogen, trihalogenmethyl, trihalogenmethoxy, benzoyl, phenylamino, acylamino and phenylazo; $C_7$-$C_8$ phenylalkyl, $C_7$-$C_9$ phenylalkyl which is substituted on the phenyl by 1, 2 or 3 radicals selected from the group consisting of $C_1$-$C_{10}$ alkyl, $C_1$-$C_{10}$ alkoxy and hydroxy; naphthyl, naphthyl substituted by $C_1C_{10}$ alkyl, adamantyl, or a 5 to 6 membered heterocyclic group; characterized in that the polypropylene resin has a content of β-form crystals of at least 10% calculated by means of the following equation β-form crystal content (%)=100×$P_{\oplus 1}$/($P_{a1}$+$P_{a2}$+$P_{a3}$+$P_{\beta 1}$) where $P_{a1}$ to $P_{a3}$ are respective peak heights (maxima) of the a-form and $P_{\beta 1}$ is a peak height (maximum) of the β-form determined by wide angle X-ray scattering.

WO 95/13317 discloses films formed from blends of high impact LLDPE and sorbitol derivatives that are said to exhibit excellent optical properties, particularly haze properties.

WO 02/46300 discloses a polypropylene composition containing the components: a) a crystallizable polypropylene homopolymer, random copolymer, alternating or segmented block copolymer or a blend of polypropylene with another synthetic polymer, and b) 0.001 to 5% relative to the weight of component b), of a specific trimesic acid derivative.

WO 2004/072168 discloses a composition containing a) a natural or synthetic polymer and b) one or more compounds of one of the following formulae wherein $R_1$, $R_2$, and $R_3$ or $Y_1$, $Y_2$, and $Y_3$, or $Z_1$, $Z_2$, and $Z_3$ are chosen from an extensive listing of moieties, e.g., branched $C_3$-$C_{20}$ alkyl.

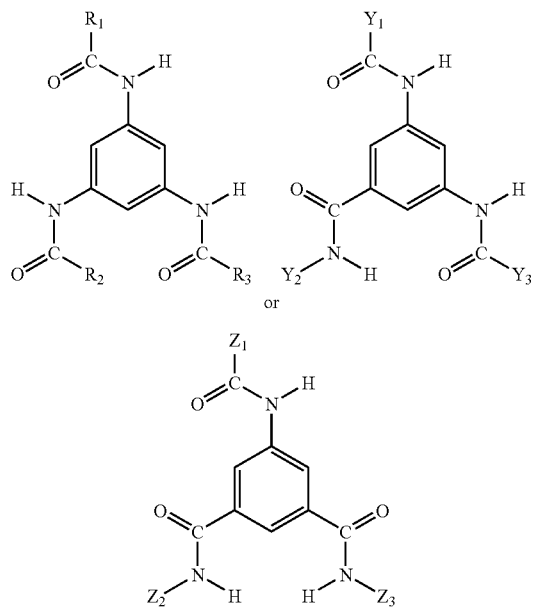

WO 2005/040263 discloses a glass fiber-reinforced molding composition composed of an olefin polymer, in particular a propylene polymer. The molding composition comprises and olefin polymer which contains 5-50% by weight of glass fibers which are bonded to the olefin polymer by means of a compatibilizer, and from $10^{-4}$ to 1% by weight of a phthalocyanine pigment as the nucleating agent.

DE-OS 1 951 632 discloses the use of carboxylicimide-diphthalimide nucleating agents.

Stocker et al., *Macromolecules* 31:807-814 (1998), reported the epitaxial crystallization of the metastable phase of isotactic polypropylene (βiPP) on two specific nucleating agents: γ-quinacridone and dicycloterephthalamide.

Varga et al., J. APPL. POLY. SCI. 74:2357-2368 (1999), reported that calcium salts of pimelic and suberic acids are highly active, thermally stable β-nucleating agents and that, in their presence, isotactic homopolymers and random and block copolymers of propylene crystallize almost purely in β modification.

Kotek et al., J. APPL. POLY. SCI. 85:1174-1184, reported the modification of the commercial grade of isotactic polypropylene by N',N'-dicyclohexyl-naphthalene-2,6-dicarboxamide in a broad concentration range.

Kristiansen et al., *Macromolecules* 36:5150-5156, investigated the phase behavior of the binary system consisting of the commercial nucleating and clarifying agent 1,3:2,4-bis(3,4-dimethyldibenzylidene)sorbitol and isotactic polypropylene over the entire concentration range by means of differential scanning calorimetry, rheology, and optical microscopy.

Blomenhofer et al., *Macromolecules* 38:3688-3695, reported the discovery of a family of organic compounds, substituted 1,3,5-benzenetrisamides, that are capable of selectively and efficiently nucleating the growth of the α-crystal modification of isotactic polypropylene, thereby clarifying it, inducing the β-polymorph, or promoting the growth of hybrids of both crystallographic modifications.

See also *Polymer Letters* 6:539-546 (1968).

The disclosures of the foregoing are incorporated herein by reference in their entirety.

SUMMARY OF THE INVENTION

The present invention relates to polypropylene resin compositions having excellent crystallizablity, high transmittance, high clarity, low haze and improved thermal stability, and containing urea phenyl derivatives, to the use of these urea phenyl derivatives as haze reducing agents, to mixtures of urea phenyl derivatives, and to novel urea phenyl derivatives.

More particularly, the present invention is directed to a composition comprising (A) a crystallizable propylene polymer, and (B) about 0.001 to about 5%, relative to the weight of component (A), of at least one urea phenyl derivative of the formula:

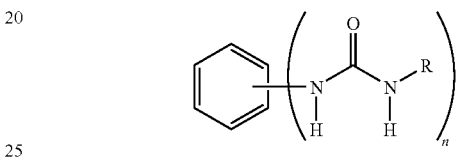

wherein each R is an independently selected hydrocarbyl group and n is 2 or 3.

In another aspect, the present invention is directed to a method for reducing haze in crystallizable propylene polymers comprising adding to said polymer about 0.001 to about 5%, relative to the weight of the polymer, of at least one urea phenyl derivative of the formula:

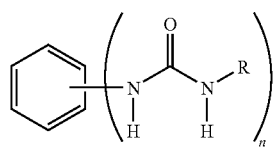

wherein each R is an independently selected hydrocarbyl group and n is 2 or 3.

In still another aspect, the present invention is directed to a urea phenyl derivative of the formula:

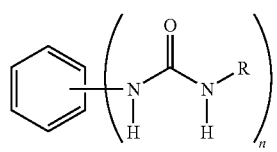

wherein each R is an independently selected hydrocarbyl group and n is 2 or 3.

DESCRIPTION OF THE PREFERRED EMBODIMENTS

As noted above, the present invention is directed urea phenyl derivatives of the formula:

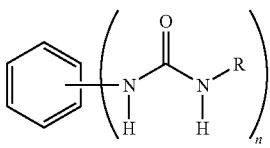

wherein each R is an independently selected hydrocarbyl group and n is 2 or 3, and to their use as nucleating agents in propylene polymers.

As employed herein, the term "hydrocarbyl" includes hydrocarbon as well as substantially hydrocarbon groups. "Substantially hydrocarbon" describes groups that contain heteroatom substituents that do not alter the predominantly hydrocarbon nature of the group, nor significantly diminish the effectiveness of the compound as a stabilizer for polymeric resins.

Examples of hydrocarbyl groups include the following:

(1) hydrocarbon substituents, i.e., aliphatic (e.g., alkyl or alkenyl), alicyclic (e.g., cycloalkyl, cycloalkenyl) substituents, aromatic-, aliphatic-, and alicyclic-substituted aliphatic substituents, aromatic substituents, aromatic-, aliphatic-, and alicyclic-substituted aromatic substituents, and the like, as well as cyclic substituents wherein the ring is completed through another portion of the molecule (that is, for example, any two indicated substituents may together form an alicyclic radical);

(2) substituted hydrocarbon substituents, i.e., those substituents containing non-hydrocarbon groups which, in the context of the present invention, do not alter the predominantly hydrocarbon nature of the substituent; those skilled in the art will be aware of such groups (e.g., halo, hydroxy, mercapto, nitro, nitroso, sulfoxy, etc.);

(3) heteroatom substituents, i.e., substituents that will, while having a predominantly hydrocarbon character within the context of the present invention, contain an atom other than carbon present in a ring or chain otherwise composed of carbon atoms (e.g., alkoxy or alkylthio). Suitable heteroatoms will be apparent to those of ordinary skill in the art and include, for example, sulfur, oxygen, nitrogen, and such substituents as, e.g., pyridyl, furyl, thienyl, imidazolyl, etc. Preferably, no more than about 2, more preferably no more than one, hetero substituent will be present for every ten carbon atoms in the hydrocarbyl group. Most preferably, there will be no such heteroatom substituents in the hydrocarbyl group, i.e., the hydrocarbyl group is purely hydrocarbon.

In one preferred aspect, the urea phenyl derivatives of the present invention are of the structure:

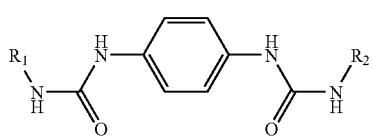

(I)

wherein $R_1$ and $R_2$ are independently selected hydrocarbyl groups as described above. Those skilled in the art will understand that $R_1$ and $R_2$ can be considered species of the genus R.

In another preferred aspect, the urea phenyl derivatives of the present invention are of the structure:

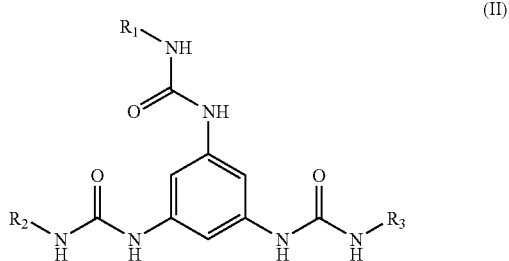

(II)

wherein $R_1$, $R_2$, and $R_3$ are independently selected hydrocarbyl groups as described above. Those skilled in the art will understand that $R_1$, $R_2$, and $R_3$ can be considered species of the genus R.

In more preferred embodiments, the R groups of the urea phenyl derivatives of the present invention are independently selected from the group consisting of:

$C_1$-$C_{20}$ alkyl;
$C_1$-$C_{20}$ alkyl substituted by $C_1$-$C_{20}$ alkylamino, di($C_1$-$C_{20}$ alkyl)amino, $C_1$-$C_{20}$ alkyloxy or hydroxy;
{poly($C_2$-$C_4$ alkoxy)}-($C_2$-$C_4$ alkyl);
$C_2$-$C_{20}$ alkenyl;
$C_3$-$C_{12}$ cycloalkyl;
$C_3$-$C_2$ cycloalkyl substituted by 1, 2 or 3 $C_1$-$C_{20}$alkyl;
cyclohexylmethyl;
cyclohexylmethyl substituted by 1, 2 or 3 $C_1$-$C_{20}$ alkyl;
$C_3$-$C_{20}$ cycloalkenyl;
$C_3$-$C_{12}$ cycloalkenyl substituted by 1, 2 or 3 $C_1$-$C_{20}$ alkyl;
phenyl;
phenyl substituted by 1, 2 or 3 radicals selected from the group consisting of $C_1$-$C_{20}$ alkyl, $C_1$-$C_{20}$ alkyloxy, hydroxy, phenylamino, acylamino, phenylazo;
phenyl substituted by halogens;
$C_7$-$C_9$ phenylalkyl;
$C_7$-$C_9$ phenylalkyl which is substituted on the phenyl by 1, 2 or 3 radicals selected from the group consisting of $C_1$-$C_{20}$ alkyl, $C_1$-$C_{20}$ alkoxy, and hydroxy;
naphthyl;
naphthyl substituted by $C_1$-$C_{20}$ alkyl;
adamantyl;
adamantyl substituted by $C_1$-$C_{20}$ alkyl; and
a 5- or 6-membered heterocyclic group.

Examples of $C_1$-$C_{20}$ alkyl include, but are not limited to, methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methyl-hexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methyl-undecyl, dodecyl, 1,1,3,3,5,5-hexamethylhexyl, tridecyl, tetradecyl, pentadecyl, hexadecyl, heptadecyl, octadecyl, and eicosyl.

Preferred examples are isopropyl, n-butyl, sec-butyl, tert-butyl, n-pentyl, 1,1-dimethylpropyl, 1,2-dimethylpropyl, 3-methylbutyl, n-hexyl, n-heptyl, n-octyl, 2-ethylhexyl, tert-octyl (1,1,3,3-tetramethylbutyl), isononyl, n-dodecyl, tridecyl, or a tallow alkyl mixture.

Tert-butyl, 3-methylbutyl, 1,2-dimethylpropyl, and tert-octyl are particularly preferred.

Examples of $C_1$-$C_{20}$ alkyl substituted by $C_1$-$C_{20}$ alkylamino, di($C_1$-$C_{20}$ alkyl)amino, $C_1$-$C_{20}$ alkyloxy, or hydroxy include, but are not limited to, 3-methylaminopropyl, 2-dimethylaminoethyl, 2-diethylaminoethyl, 3-dimethylaminopropyl, 3-dimethylaminopropyl, 2-methoxyethyl, 2-ethoxyethyl, 2-methoxypropyl, 2-ethoxypropyl, 3-isopropoxypropyl, and hydroxyethyl.

One example, among many, of a {poly($C_2$-$C_4$ alkoxy)}-($C_2$-$C_4$ alkyl) is {polypropylene oxide}propyl.

Examples of $C_2$-$C_{20}$ alkenyl include, but are not limited to, allyl, 2-methallyl, butenyl, pentenyl, hexenyl, and oleyl. The carbon atom in position 1 is preferably saturated.

Particularly preferred examples are allyl and oleyl.

Examples of $C_3$-$C_{12}$ cycloalkyl include, but are not limited to, cyclopropyl, cyclobutyl, cyclopentyl, cyclohexyl, cycloheptyl, cyclooctyl, and cyclododecyl. Preferred examples are cyclopentyl and cyclohexyl.

A preferred example of $C_3$-$C_{12}$ cycloalkyl substituted by 1, 2 or 3 $C_1$-$C_{20}$ alkyl is 2-methylcyclohexyl.

An example of cyclohexylmethyl substituted by 1, 2 or 3 $C_1$-$C_{20}$ alkyl is methyl cyclohexylmethyl.

An example of $C_3$-$C_{12}$ cycloalkenyl is cyclohexenyl.

An example of $C_3$-$C_{12}$ cycloalkenyl substituted by 1, 2 or 3 $C_1$-$C_{20}$ alkyl is methylcyclohexanyl.

Examples of phenyl substituted by 1, 2 or 3 radicals selected from the group consisting of $C_1$-$C_{20}$ alkyl, $C_1$-$C_{20}$ alkyloxy, hydroxy, halogen, trihalogenmethyl, trihalogenmethoxy, benzoyl, phenylamino, acylamino and phenylazo include, but are not limited to, 4-methyl phenyl, 2-ethylphenyl, 4-ethylphenyl, 4-isopropylphenyl, 4-tert-butylphenyl, 4-sec-butylphenyl, 4-isobutylphenyl, dodecylphenyl, 3,5-dimethylphenyl, 3,4-dimethylphenyl, 2,4-dimethylphenyl, 2,6-diethylphenyl, 2-ethyl-6-methylphenyl, 2,6-diisopropylphenyl, 4-methoxyphenyl, 4-ethoxyphenyl, 4-hydroxyphenyl, 4-fluorophenyl, 3,5-difluorophenyl, 2-chlorophenyl, 3-chlorophenyl, 3-chloro-6-methylphenyl, 3,5-di(trifluoromethyl)phenyl, 4-trifluoromethoxyphenyl, 2-benzylphenyl, 4-phenylaminophenyl, 4-acetamidophenyl, and 4-(phenylazo)phenyl.

Halogen substituents are preferably fluorine or chlorine. An example of phenyl substituted by five halogens is pentafluorophenyl.

Examples of $C_7$-$C_9$ phenylalkyl include, but are not limited to, benzyl and 2-phenylethyl.

Examples of $C_7$-$C_9$ phenylalkyl which is substituted on the phenyl by 1, 2 or 3 radicals selected from the group consisting of $C_1$-$C_{20}$ alkyl, $C_1$-$C_{20}$ alkoxy, and hydroxy include, but are not limited to, methylbenzyl, dimethylbenzyl, trimethylbenzyl, tert-butylbenzyl, methoxybenzyl, and 3,5-di-tert-butyl-4-hydroxybenzyl.

An example of naphthyl substituted by $C_1$-$C_{20}$ alkyl is methylnaphthyl.

An example of adamantyl substituted by $C_1$-$C_{20}$ alkyl is methyladamantyl.

Examples of 5- or 6-membered heterocyclic groups include, but are not limited to, 2-picolyl, (2-furyl)methyl, (2-tetrahydrofuryl)methyl, 2-pyrimidyl, 6-methyl-2-pyridyl, 1,2,4-triazol-3-yl, and 2-(1-piperazinyl)ethyl.

Of interest in the practice of the present invention are crystallizable polypropylene compositions wherein the R groups, independently of one another, are:

$C_1$-$C_{18}$ alkyl;
$C_1$-$C_{10}$ alkyl substituted by $C_1$-$C_4$ alkylamino, di($C_1$-$C_4$ alkyl)amino, $C_1$-$C_4$ alkyloxy, or {poly($C_2$-$C_4$ alkoxy)}-($C_2$-$C_4$ alkyl);
$C_3$-$C_{18}$ alkenyl;
$C_5$-$C_6$ cycloalkyl;
$C_5$-$C_6$ cycloalkyl substituted by 1, 2 or 3 $C_1$-$C_4$ alkyl;
cyclohexylmethyl;
cyclohexylmethyl substituted by 1, 2 or 3 $C_1$-$C_4$ alkyl;
phenyl;
phenyl substituted by 1, 2 or 3 radicals selected from the group consisting of $C_1$-$C_4$ alkyl, $C_1$-$C_4$ alkyloxy, hydroxy, halogen, benzoyl, phenylamino, $C_1$-$C_4$ alkanoylamino, and phenylazo;
benzyl;
benzyl substituted on the phenyl by 1, 2 or 3 radicals selected from the group consisting of $C_1$-$C_4$ alkyl, $C_1$-$C_4$ alkoxy, and hydroxy;
phenylethyl;
phenylethyl substituted on the phenyl by 1, 2 or 3 radicals selected from the group consisting of $C_1$-$C_4$ alkyl, $C_1$-$C_4$ alkoxy, and hydroxy;
naphthyl;
naphthyl substituted by $C_1$-$C_4$ alkyl;
adamantyl;
adamantyl substituted by $C_1$-$C_4$ alkyl; or
a 5 to 6 membered heterocyclic group.

Of further interest in the practice of the present invention is a crystallizable polypropylene composition wherein the R groups, independently of one another, are:

$C_3$-$C_8$ alkyl;
$C_5$-$C_6$ cycloalkyl;
cyclohexylmethyl;
$C_5$-$C_6$ cycloalkyl substituted by 1, 2 or 3 $C_1$-$C_4$ alkyl; or
adamantyl.

Also of interest is a polypropylene composition wherein the R groups, independently of one another, are $C_3$-$C_8$ alkyl;
$C_5$-$C_6$ cycloalkyl;
cyclohexylmethyl;
$C_5$-$C_6$ cycloalkyl substituted by 1, 2 or 3 $C_1$-$C_4$ alkyl; or
adamantyl.

Preferably, the R groups are identical and are selected from the group consisting of isopropyl, 2-methylpropyl, 1-ethylpropyl, 1,1-dimethylpropyl, 1,2-dimethylpropyl, n-butyl, 2-butyl, tert-butyl, 3-methylbutyl, 1,1,3,3-tetramethylbutyl, cyclobutyl, cyclopentyl, cyclohexyl, 2-methylcyclohexyl, 4-methylcyclohexyl, cyclohexylmethyl, 3,3,5-trimethylcyclohexyl, and 1-adamantyl; more preferably, isopropyl, 2-methylpropyl, 1,1-dimethylpropyl, 1,2-dimethylpropyl, 2-butyl, tert-butyl, 3-methylbutyl, 1,1,3,3-tetramethylbutyl, cyclopentyl, cyclohexyl, 2-methylcyclohexyl, cyclohexylmethyl, and 1-adamantyl; most preferably, isopropyl, 2-butyl, tert-butyl, cyclopentyl, cyclohexyl, 2-methylcyclohexyl, and 1-adamantyl.

In another particularly preferred embodiment of the present invention the R groups are identical and are selected from the group consisting of 1,2-dimethylpropyl, tert-butyl, 3-methylbutyl, 1,1,3,3-tetramethylbutyl, cyclopentyl, and cyclohexyl. Even more preferably, the R groups are identical and are selected from the group consisting of 1,2-dimethylpropyl, 3-methylbutyl, and cyclopentyl.

Component (B) is present in the compositions of the present invention at a concentration of from about 0.01 to about 5%, preferably about 0.01 to about 2%, more preferably about 0.05 to about 1%, most preferably about 0.15 to about 1%, relative to the weight of component (A).

In a further preferred embodiment of the present invention, the crystallizable polypropylene composition comprises as additional component (C) about 0.001 to about 5%, preferably about 0.01 to about 5%, relative to the weight of component (A), of a conventional nucleating agent, such as the commercially available Hyperform HPN 68L.

Examples of such conventional nucleating agents, which are commercially available, include, but are not limited to, (1) Aromatic sorbitol acetals, for example, 1,3:2,4-bis(benzylidene)sorbitol; 1,3:2,4-bis(4-methylbenzylidene)sorbitol; 1,3:2,4-bis(3,4-dimethylbenzylidene)sorbitol; or 1,3:2,4-bis(4-ethylbenzylidene)sorbitol.

(2) Nucleating agents based upon salts of phosphoric acid, for example 2,2'-methylene-bis-(4,6-di-tert-butylphenyl)phosphate.

(3) Nucleating agents based upon salts of carboxylic acid, for example, sodium benzoate.

(4) Nucleating agents based upon carboxy aluminum-hydroxide, for example aluminum hydroxy-bis[4-(tert-butyl)benzoate].

(5) Nucleating agents based upon salts of rosin/adiabatic acid.

(6) Zinc (II) monoglycerolate.

(7) Nucleating agents based upon diamide compounds as disclosed in U.S. Pat. No. 6,235,823, for example, N-cyclohexyl-4-(N-cyclohexylcarbonylamino)benzamide and N,N'-1,4-cyclohexane-bis-benzamide.

(8) Nucleating agents based upon trimesic acid derivatives as disclosed in WO 02/46300, WO 03/102069, WO 2004/072168, for example, 1,3,5-benzenetricarboxylic acid tris(cyclopentylamide); 1,3,5-benzenetricarboxylic acid tris(cyclohexylamide); and 1,3,5-benzenetricarboxylic acid tris(tert-butylamide).

The term "polypropylene polymer" as used herein means not only a crystallizable polypropylene homopolymer, but also a crystallizable polymer predominantly comprising propylene, particularly a polymer comprising not less than 50% by weight, preferably not less than 80% by weight, of propylene. As examples of the latter polymer, there may be mentioned random copolymers, e.g., propylene-ethylene random copolymer, alternating or segmented copolymers, block copolymers, e.g., propylene-ethylene block copolymer, polymer blends of said polypropylene resin with one or more other thermoplastic resins, such as high-density polyethylene, polybutene-1, poly-4-methylpentene-1, and the like.

According to a preferred embodiment of the present invention component (A) is a polypropylene homopolymer, wherein the term "polypropylene homopolymer" is also intended to include long chain branched polypropylene.

The crystallizable polypropylene employed in the practice of the present invention can be prepared by various, and especially by, the following, methods:

Catalytic polymerization using a catalyst that normally contains one or more than one metal of groups IVb, Vb, VIb, or VIII of the Periodic Table. These metals usually at least one ligand, typically oxides, halides, alcoholates, esters, ethers, amines, alkyls, alkenyls, and/or aryls that may be either $\pi$ or $\sigma$-coordinated. These metal complexes may be in the free form or fixed on substrates, typically on activated magnesium chloride, titanium(III) chloride, alumina, or silicon oxide. These catalysts may be soluble or insoluble in the polymerization medium. The catalysts can be used by themselves in the polymerization or further activators may be used, typically metal, alkyls, metal hydrides, metal alkyl halides, metal alkyl oxides, or metal alkyloxanes, said metals being elements of groups Ia, Ia, and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene, or single site catalysts (SSC).

When component (A) is a Ziegler-Natta propylene homopolymer, the polypropylene composition according to the present invention preferably has a haze of about 5 to about 40% preferably about 15 to about 40%, more preferably about 20 to about 40%, most preferably about 25 to about 40%. In this case, the clarity determined according to the working examples is, e.g. 90 to 99.9%, in particular 90 to 99%, 95 to 99.9%, or 95 to 99%.

When component (A) is a Ziegler-Natta polypropylene copolymer, the polypropylene composition according to the present invention has preferably a haze of about 4 to about 40%, preferably about 4 to about 30%, more preferably about 4 to about 20%, most preferably about 4 to about 15%. In this case, the clarity determined according to the working examples is as above, e.g. 90 to 99.9%.

When component (A) is a metallocene propylene homopolymer, the polypropylene composition according to the present invention preferably has a haze of about 5 to about 30%, preferably about 5 to about 20%, more preferably about 5 to about 15%, most preferably about 5 to about 10%. In this case, the clarity determined according to the working examples is as above, e.g., 90 to 99.9%.

When component (A) is a metallocene propylene copolymer, the polypropylene composition according to the present invention preferably has a haze of about 3 to about 25%, preferably about 3 to about 20%, more preferably about 3 to about 15%, most preferably about 3 to about 8%. In this case, the clarity determined according to the working examples is again as above, e.g. 90 to 99.9%.

According to another preferred embodiment of the present invention, component (A) is a crystallizable polypropylene random copolymer, alternating or segmented copolymer, or block copolymer containing one or more comonomers selected from the group consisting of ethylene, $C_4$-$C_{20}$-$\alpha$-olefin, vinylcyclohexane, vinylcyclohexane, $C_4$-$C_{20}$ alkandiene, $C_5$-$C_{12}$ cycloalkandiene and norbornene derivatives; the total amount of propylene and the comonomer(s) being 100%.

As noted above, the term "crystallizable polypropylene copolymer" also includes long chain branched polypropylene copolymers.

Examples of comonomers include, but are not limited to, suitable $C_4$-$C_{20}$ $\alpha$-olefins, such as 1-butene, 1-pentene, 1-hexene, 1-heptene, 1-octene, 1-nonene, 1-decene, 1-undecene, 1-dodecene, 1-tetradecene, 1-hexadecene, 1-octadecene, 1-eicosene, and 4-methyl-1-pentene.

Examples of suitable $C_4$-$C_{20}$ alkadienes include, but are not limited to, hexadiene and octadiene.

Examples of suitable $C_5$-$C_{12}$ cycloalkandienes include, but are not limited to, cyclopentadiene, cyclohexadiene, and cyclooctadiene.

Examples of suitable norbornene derivatives include, but are not limited to, 5-ethylidene-2-norbornene (ENB), dicyclopentadiene (DCP), and methylene-dimethylene-hexahydronaphthalene (MEN).

A preferred propylene/ethylene copolymer comprises, for example, 50 to 99.9%, preferably 80 to 99.9%, more preferably 90 to 99.9% by weight of propylene.

A preferred propylene copolymer wherein the comonomer is a $C_9$-$C_{20}$ $\alpha$-olefin such as, e.g., 1-nonene, 1-decene, 1-undecene, 1-dodecene, 1-tetradecene, 1-hexadecene, 1-octadecene or 1-eicosene; $C_9$-$C_{20}$ alkandiene, $C_9$-$C_{12}$ cycloalkandiene, or a norbornene derivative, such as, e.g., 5-ethylidene-2-norbornene (ENB) or methylene-dimethylene-hexahydronaphthalene (MEN) preferably comprises at least 90 mol %, more preferably 90 to 99.9 mol %, most preferably 90 to 99 mol %, of propylene.

A preferred propylene copolymer wherein the comonomer is a $C_4$-$C_6$ $\alpha$-olefin, such as 1-butene, 1-pentene, 1-hexene, 1-heptene, 1-octene or 4-methyl-1-pentene; vinylcyclohexane, vinylcyclohexane, $C_4$-$C_8$ alkandiene, or $C_5$-$C_8$ cycloalkandiene preferably comprises at least 80 mol %, more preferably 80 to 99.9 mol %, most preferably 80 to 99 mol %, of propylene.

Further examples of component (A) include, but are not limited to, propylene/isobutylene copolymer, propylene/butadiene copolymer, propylene/cycloolefin copolymer, terpolymers of propylene with ethylene and a diene such as hexadiene, dicyclopentadiene, or ethylidene-norbornene; propylene/1-olefin copolymers where the 1-olefin is generated in situ; and propylene/carbon monoxide copolymers.

Other examples of component (A) include, but are not limited to, blends of polypropylene with propylene/ethylene copolymers, propylene/butylene copolymers, polyethylene, e.g. HDPE or LDPE; polybutene, polyisobutylene, poly-4-methylpentene, or alternating or random polyalkylene/carbon monoxide copolymers. These blends preferably comprise at least 50% by weight, relative to the weight of the total blend, of polypropylene.

The urea phenyl derivative nucleating agents of the present invention can be added to the crystallizable polypropylene resin at any convenient stage, e.g., during the polymerization reaction or after the polymer has been prepared.

The melt flow rate of the crystallizable propylene polymers of the present invention can be appropriately selected according to the requirements of a molding method to be employed and is generally in the range of from about 0.1 to 100 g/10 min. and preferably about 0.5 to 50 g/10 min.

If required, the compositions of the present invention may contain a variety of additives, such as a stabilizer (e.g. epoxy compounds), an antioxidant (e.g. phenol compounds, phosphite compounds), an ultraviolet absorber (benzophenone compounds, benzotriazole compounds), a neutralizer, a nucleating agent, an antistatic agent, an antiblocking agent, a lubricant (e.g. aliphatic hydrocarbons, higher fatty acids, and the alkali metal salts or alkaline earth metal salts thereof, fatty acid esters, higher fatty acid amides, rosin derivatives), a colorant, an elastomer, and a mineral (e.g. talc, hydrotalcite), each within a range not interfering with the effect of the invention.

The crystallizable propylene polymer compositions of the invention are preferably produced by mixing the nucleating agent(s) and the polypropylene, with or without addition of said additives, in an ordinary mixer, such as a Henschel mixer, and if necessary, pelletizing the resulting mixture using an ordinary pelletizer, such as a single-screw extruder, in a known manner.

The resulting crystalline polypropylene resin composition of the invention can be molded by various known techniques. Thus, injection molding, extrusion molding, compression molding, and other molding techniques utilizing conventional molding machines can be employed. Molding conditions may be those commonly employed. Typical preferred molding conditions may be as follows.

Injection molding: resin temperature about 200 to 300° C., preferably about 240 to 280° C.; mold temperature about 30 to 120° C., preferably about 50 to 80° C.

Extrusion molding: resin temperature about 200 to 300° C., preferably about 240 to 280° C.; chill roll temperature about 40 to 140° C., preferably about 60 to 120° C.

Compression molding: temperature of melted resin about 200 to 300° C., preferably about 240 to 280° C.; cooling temperature about 30 to 120° C., preferably about 50 to 1001° C.

Molded product, which contains much higher proportion of β-crystal form than before and which is satisfactory in the aspect of color, can be easily obtained by molding under the above-mentioned molding conditions the resin composition of the invention prepared with use of the above-mentioned mixing method. Compared with the conventional polypropylene pellet which does not substantially contain β-crystals, but is predominantly composed of α-crystals, the polypropylene molded product has lower melting point and requires less force for deformation under heating. Therefore, the molded products contribute a great deal to improved secondary processability and mechanical characteristics. The products encompass a wide variety of forms such as packages, sheet, film, and the like.

With the resin composition of the present invention, the ratio of α- to β-forms in the final product can be controlled as desired by suitably selecting molding conditions, such as cooling conditions. For example, the proportion of R-form is increased as a higher cooling temperature is employed. Thus, it is possible to control the ratio of α- to β-forms by appropriately selecting cooling conditions under the above molding condition. This characteristic is beneficial particularly in the surface roughening of biaxially oriented film. The film having such a roughened surface displays excellent anti-blocking properties, printability, adhesion, and the like, and is of great use in the fields of packaging film, printing paper, tracing paper, oil-immersion type plastic capacitors, and the like.

The advantages and the important features of the present invention will be more apparent from the following examples.

EXAMPLES

Example 1

Preparation of the Compound of the Formula

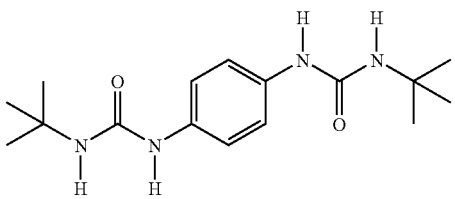

Six grams of para-phenyldiisocyanate (Mn=160.13, 74.94 mmol, 1.00 eq.) is added under ambient conditions to 150 mL of dichloromethane containing 20 mL of tert-butylamine (d=0.69, Mn=73.14, 13.8 gram, 188.68 mmol, 2.51 eq., b.p. 46° C.). The reaction is exothermic and a white solid precipitates out immediately upon mixing. The mixture is stirred at room temperature for two hours. The precipitate is filtered off and washed with dichloromethane to give the product as a white powder.

Formula: $C_{16}H_{26}N_4O_2$, Mn=306.41 Yield: 11.0 grams, 95.2% m.p. >350° C. $^1$H NMR ($CF_3COOD/CDCl_3$ 1:1 v/v) δ=7.28 (4H, s), 1.39 (18H, s) ppm $^{13}$C NMR ($CF_3COOD/CDCl_3$ 1:1 v/v) δ=158.03 (s), 134.09 (s), 125.11 (d), 52.59 (s), 29.12 (q) ppm

Example 2

Preparation of the Compound of the Formula

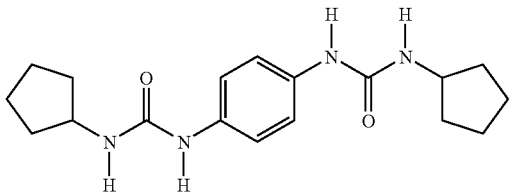

Ten grams of para-phenyldiisocyante (Mn=160.13, 124.90 mmol, 1.00 eq.) is added under ambient conditions to 150 mL of dichloromethane containing 14 mL of cyclopentylamine (d=0.86, Mn=85.15, 12.04 gram, 141.40 mmol, 1.13 eq., b.p. 106-108° C.). The reaction is exothermic and a white solid precipitates out immediately upon mixing. The mixture is stirred at room temperature for two hours. The precipitate is filtered off and washed with dichloromethane to give the product as a white powder.

Formula: $C_{14}H_{20}N_4O_2$, Mn=276.34 Yield: 16.5 grams, 95.6% m.p. >350° C. $^1$H NMR ($CF_3COOD/CDCl_3$ 1:1 v/v) δ=7.29 (4H, s), 4.07 (2H, m, J=6.6 Hz), 1.99-2.05 (4H, m), 1.64 (8H, m), 1.50 (4H, m) ppm. $^{13}$C NMR ($CF_3COOD/CDCl_3$ 1:1 v/v) δ=158.34 (s), 133.73 (s), 125.31 (d), 53.34 (d), 33.09 (t), 23.63 (t) ppm.

Example 3

Preparation of the Compound of the Formula

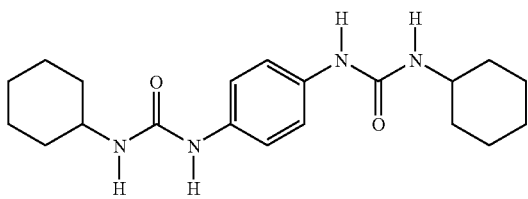

Five grams cyclohexylisocyanate (Mn=125.17, 39.95 mmol, 1.08 eq.) is added to 30 mL of N-methylpyrrolidone containing two grams of p-phenylenediamine (Mn=108.14, 36.99 mmol, 1.00 eq.). The mixture was heated to 75° C. and stirred for two hours. The mixture is then cooled down and poured into 200 grams of ice water, yielding a light yellowish solid that is filtered, washed with water, and dried under vacuum.

Formula: $C_{20}H_{30}N_4O_2$, Mn=358.48 Yield: 6.3 grams, 95.0% m.p. >350° C. $^1$H NMR ($CF_3COOD/CDCl_3$ 1:1 v/v) δ=7.22 (4H, s), 3.74 (2H, m), 1.67-1.95 (8H, m), 1.25-1.38 (12H, m) ppm. $^{13}$C NMR ($CF_3COOD/CDCl_3$ 1:1) δ=158.09 (s), 133.74 (s), 125.95 (d), 51.14 (d), 32.96 (t), 25.19 (t), 24.75 (t) ppm.

Example 4

Preparation of the Compound of the Formula

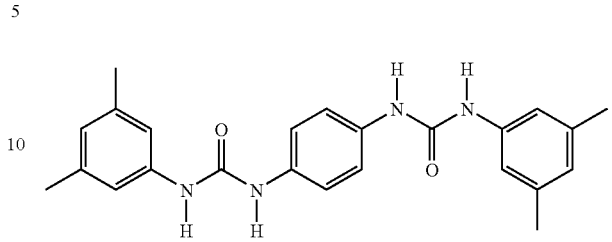

Five grams of 3,5-dimethylphenyl isocyanate (Mn=147.18, 33.97 mmol, 1.02 eq.) is added to 30 mL of N-methylpyrrolidone containing 1.8 grams of p-phenylenediamine (Mn=108.14, 33.29 mmol, 1.00 eq.). The mixture is heated to 75° C. and stirred for two hours. The mixture is then cooled down and poured into 200 grams of ice water, yielding a light yellowish solid that is filtered, washed with water, and dried under vacuum.

Formula: $C_{24}H_{26}N_4O_2$, Mn=402.5 Yield: 6.3 grams, 94.5% m.p. >350° C. $^1$H NMR ($CF_3COOD/CDCl_3$ 1:1) δ=7.34 (4H, s), 7.06 (2H, s), 6.93 (4H, s), 2.33 (12H, s) ppm. $^{13}$C NMR ($CF_3COOD/CDCl_3$ 1:1) δ=158.76 (s), 141.12 (s), 133.81 (s), 130.53 (d), 125.55 (d), 123.13 (d), 20.65 (q) ppm.

Example 5

Preparation of the Compound of the Formula

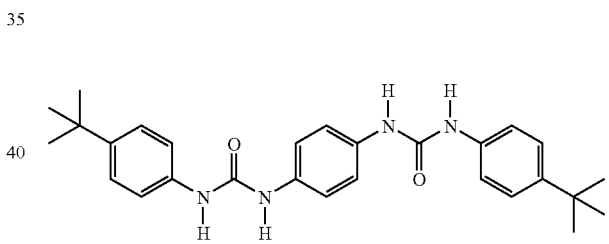

Ten grams of 4-tert-butylphenyl isocyanate (Mn=175.23, 57.07 mmol, 1.03 eq.) is added to 30 mL of N-methylpyrrolidone containing 3.0 grams of p-phenylenediamine (Mn=108.14, 55.48 mmol, 1.00 eq.). The mixture is heated to 75° C. and stirred for two hours. The mixture is then cooled down and poured into 200 grams of ice water, yielding a light yellowish solid that is filtered, washed with water, and dried under vacuum.

Formula: $C_{28}H_{34}N_4O_2$, Mn=458.60 Yield: 8.0 grams, 62.9% m.p. >350° C. $^1$H NMR ($CF_3COOD/CDCl_3$ 1:1) δ=7.54 (4H, d, J=9.9 Hz), 7.45 (4H, d, J=9.9 Hz), 7.34 (4H, s), 1.34 (18H, s) ppm. $^{13}$C NMR ($CF_3COOD/CDCl_3$ 1:1) δ=152.84 (s), 138.17 (s), 131.38 (s), 127.68 (d), 125.39 (d), 124.18 (d), 34.90 (s), 30.91 (q) ppm.

Mixing Procedure

To 59.91 grams of powdered polypropylene, 90 mg of a powdered additive (0.15% by weight) or a powdered mixture of additives (total 0.15% by weight) is added and tumble-mixed for 24 hours in a glass container. In general, 4.5 grams of this mixture are compounded at 239° C. in a small-scale, laboratory twin-screw, recirculating and co-rotating extruder, for example the MicroCompounder of DACA Instruments, for a period of about four minutes at a screw speed of 40 rpm, and subsequently collected at room temperature. The neat polypropylene is similarly treated to produce a blank control sample.

Injection Molding

Injection molding is performed with a MicroInjector (DACA Instruments). About 3.0 grams of the pelletized thread is placed under a nitrogen blanket in the barrel at 260° C. After the granulate is completely molten, the melt is injected into a polished mold with a pressure of about 8 bar. The mold temperature is 20° C. The collected test specimen has a diameter of 2.5 cm and a thickness of about 1.1-1.2 mm.

Differential Scanning Calorimetry (DSC)

A Mettler Toledo Star SW 7.01 DSC instrument (Model DSC 7), operated in a dry nitrogen atmosphere, is used for the analysis of the crystallization behavior of the various mixtures and control samples, according to standard procedures. About 5 to 10 mg of sample is sealed into an aluminum cup, heated from 25° C. to 200° C. at a rate of 20° C./min, held at 200° C. for one minute, and then subsequently cooled at a rate of 20° C./min to 25° C. The data represented as crystallization temperatures are the peak temperatures of the exotherms in the thermograms that are recorded upon cooling.

Optical Characterization (Transmission, Clarity, Haze)

Transmission, clarity, and haze are measured with a haze-gard plus instrument (BYK, Gardner, illumination CIE-C) at room temperature. The haze-gard plus instrument conforms to ASTM D-1003. The transmission, clarity, and haze values are measured between 12-24 hours after obtaining the samples by injection molding.

Example 6

Compounds of the formula (I) (0.50 wt %) with $R_1$ and $R_2$ as indicated in Table 1 are added to polypropylene resin, processed, and characterized according to the above methods.

The crystallization temperature ($T_{cryst}$), haze, clarity and transmission of the polypropylene composition according to the present Invention are listed in Table 1 as well as the thickness of the test specimen (plate).

TABLE 1

| Compound No. | $R_1, R_2$ | $T_{cryst}$ [° C.] | Thickness [mm] | Haze [%] |
|---|---|---|---|---|
| None | | 107.9 | 40.0 | 40.51 |
| Nucleating agent* | | 121.8 | 40.0 | 33.70 |
| Hyperform HPN 68L nucleating agent | | 122.5 | 40.0 | 50.62 |
| 1 | tert-butyl | 115.0 | 40.0 | 73.67 |
| 2 | Cyclopentyl | 121.8 | 40.0 | 32.58 |
| 3 | Cyclohexyl | 120.5 | 40.0 | 38.82 |

*1,3:2,4-bis(3,4-dimethylbenzylidene)sorbitol

In view of the many changes and modifications that can be made without departing from principles underlying the invention, reference should be made to the appended claims for an understanding of the scope of the protection to be afforded the invention.

What is claimed is:

1. A composition comprising:
   (A) a crystallizable polypropylene polymer, and
   (B) about 0.001 to about 5%, relative to the weight of component (A), of at least one urea phenyl derivative of the formula:

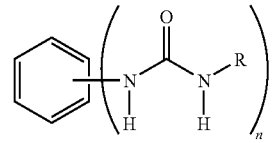

wherein each R is an independently selected hydrocarbyl group and n is 2 or 3.

2. The composition of claim 1 wherein the urea phenyl derivative is of the formula:

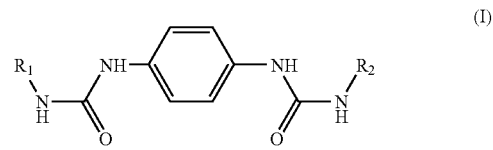

(I)

wherein $R_1$ and $R_2$ are independently selected hydrocarbyl groups.

3. The composition of claim 1 wherein the urea phenyl derivative is of the formula:

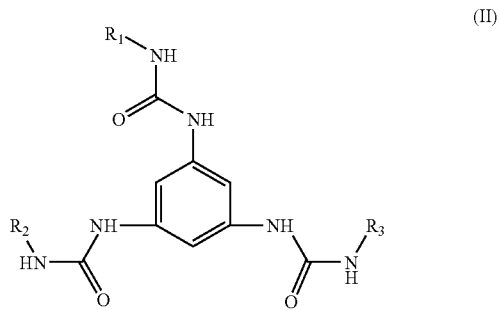

(II)

wherein $R_1$, $R_2$, and $R_3$ are independently selected hydrocarbyl groups.

4. The composition of claim 1 wherein each R is independently selected from the group consisting of: $C_1$-$C_{20}$ alkyl; $C_1$-$C_{20}$ alkyl substituted by $C_1$-$C_{20}$ alkylamino, di($C_1$-$C_{20}$ alkyl)amino, $C_1$-$C_{20}$ alkyloxy or hydroxy; {poly($C_2$-$C_4$ alkoxy)}-($C_2$-$C_4$ alkyl); $C_2$-$C_{20}$ alkenyl; $C_3$-$C_{12}$ cycloalkyl; $C_3$-$C_{12}$ cycloalkyl substituted by 1, 2 or 3 $C_1$-$C_{20}$ alkyl; cyclohexylmethyl; cyclohexylmethyl substituted by 1, 2 or 3 $C_1$-$C_{20}$ alkyl; $C_3$-$C_{20}$ cycloalkenyl; $C_3$-$C_{12}$ cycloalkenyl substituted by 1, 2 or 3 $C_1$-$C_{20}$ alkyl; phenyl; phenyl substituted by 1, 2 or 3 radicals selected from the group consisting of $C_1$-$C_{20}$ alkyl, $C_1$-$C_{20}$ alkyloxy, hydroxy, phenylamino, acylamino, phenylazo; phenyl substituted by halogens; $C_7$-$C_9$ phenylalkyl; $C_7$-$C_9$ phenylalkyl which is substituted on the phenyl by 1, 2 or 3 radicals selected from the group consisting of $C_1$-$C_{20}$ alkyl, $C_1$-$C_{20}$ alkoxy, and hydroxy; naphthyl; naphthyl substituted by $C_1$-$C_{20}$ alkyl; adamantyl; adamantyl substituted by $C_1$-$C_{20}$ alkyl; and a 5- or 6-membered heterocyclic group.

5. The composition of claim 2 wherein $R_1$ and $R_2$ are the same and are selected from the group consisting of 1,2-dimethylpropyl, 3-methylbutyl, and cyclopentyl.

6. The composition of claim 3 wherein $R_1$, $R_2$, and $R_3$ are the same and are selected from the group consisting of 1,2-dimethylpropyl, 3-methylbutyl, and cyclopentyl.

7. The composition of claim 1 further comprising about 0.001 to about 5%, relative to the weight of component (A), of at least one additional nucleating agent selected from the group consisting of: (1) Aromatic sorbitol acetals; (2) Nucleating agents based upon salts of phosphoric acid; (3) Nucleating agents based upon salts of carboxylic acids; (4) Nucleating agents based upon carboxy aluminum-hydroxide; (5) Nucleating agents based upon salts of rosin/adiabatic acid; (6) Zinc (II) monoglycerolate; (7) Nucleating agents based upon diamide compounds; and (8) Nucleating agents based upon trimesic acid derivatives.

8. A method for reducing haze in crystallizable polypropylene polymers comprising adding to said polymer about 0.001 to about 5%, relative to the weight of the polymer, of at least one urea phenyl derivative of the formula:

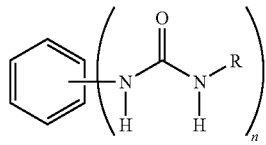

wherein each R is an independently selected hydrocarbyl group and n is 2 or 3.

9. The method of claim 8 wherein the urea phenyl derivative is of the formula:

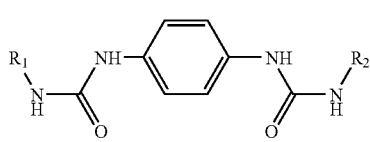

(I)

wherein $R_1$ and $R_2$ are independently selected hydrocarbyl groups.

10. The method of claim 8 wherein the urea phenyl derivative is of the formula:

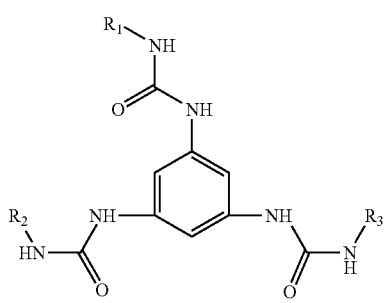

(II)

wherein $R_1$, $R_2$, and $R_3$ are independently selected hydrocarbyl groups.

11. The method of claim 8 wherein each R is independently selected from the group consisting of: $C_1$-$C_{20}$ alkyl; $C_1$-$C_{20}$ alkyl substituted by $C_1$-$C_{20}$ alkylamino, di($C_1$-$C_{20}$ alkyl) amino, Ci-$C_{20}$ alkyloxy or hydroxy; {poly($C_2$-$C_4$ alkoxy)}-($C_2$-$C_4$ alkyl); $C_2$-$C_{20}$ alkenyl; $C_3$-$C_{12}$ cycloalkyl; $C_3$-$C_{12}$ cycloalkyl substituted by 1, 2 or 3 $C_1$-$C_{20}$ alkyl; cyclohexylmethyl; cyclohexylmethyl substituted by 1, 2 or 3 $C_1$-$C_{20}$ alkyl; $C_3$-$C_{20}$ cycloalkenyl; $C_3$-$C_{12}$ cycloalkenyl substituted by 1, 2 or 3 $C_1$-$C_{20}$ alkyl; phenyl; phenyl substituted by 1, 2 or 3 radicals selected from the group consisting of $C_1$-$C_{20}$ alkyl, $C_1$-$C_{20}$ alkyloxy, hydroxy, phenylamino, acylamino, phenylazo; phenyl substituted by halogens; $C_7$-$C_9$ phenylalkyl; $C_7$-$C_9$ phenylalkyl which is substituted on the phenyl by 1, 2 or 3 radicals selected from the group consisting of $C_1$-$C_{20}$ alkyl, $C_1$-$C_{20}$ alkoxy, and hydroxy; naphthyl; naphthyl substituted by $C_1$-$C_{20}$ alkyl; adamantyl; adamantyl substituted by $C_1$-$C_{20}$ alkyl; and a 5- or 6-membered heterocyclic group.

12. The method of claim 9 wherein $R_1$ and $R_2$ are the same and are selected from the group consisting of 1,2-dimethylpropyl, 3-methylbutyl, and cyclopentyl.

13. The method of claim 10 wherein $R_1$, $R_2$, and $R_3$ are the same and are selected from the group consisting of 1,2-dimethylpropyl, 3-methylbutyl, and cyclopentyl.

14. A composition of matter comprising a urea phenyl derivative of the formula:

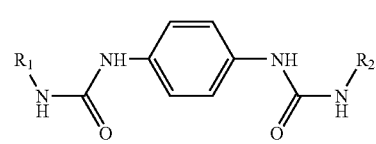

(I)

wherein $R_1$ and $R_2$ are the same and are selected from the group consisting of 1,2-dimethylpropyl, 3-methylbutyl, and cyclopentyl.

15. A composition of matter comprising a urea phenyl derivative of the formula:

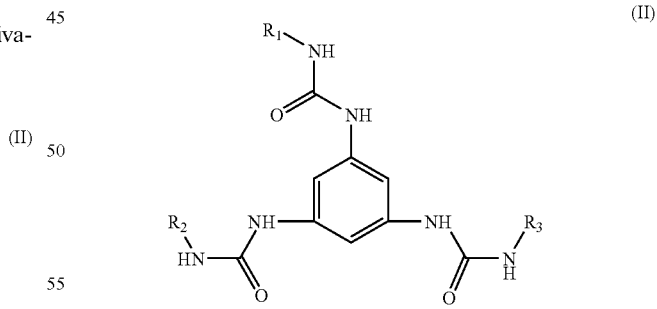

(II)

wherein $R_1$, $R_2$, and $R_3$ are the same and are selected from the group consisting of 1,2-dimethylpropyl, 3-methylbutyl, and cyclopentyl.

* * * * *